(12) United States Patent
Yamamoto et al.

(10) Patent No.: US 11,303,228 B2
(45) Date of Patent: Apr. 12, 2022

(54) DRIVING DEVICE, OPTICAL DEVICE, AND IMAGE PICKUP DEVICE

(71) Applicant: CANON KABUSHIKI KAISHA, Tokyo (JP)

(72) Inventors: Yasufumi Yamamoto, Kawasaki (JP); Ryo Yamasaki, Tokyo (JP); Shunsuke Ninomiya, Yokohama (JP); Mai Nakabayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 16/520,943

(22) Filed: Jul. 24, 2019

(65) Prior Publication Data

US 2019/0348928 A1    Nov. 14, 2019

Related U.S. Application Data

(63) Continuation of application No. PCT/JP2018/002485, filed on Jan. 26, 2018.

(30) Foreign Application Priority Data

Jan. 30, 2017  (JP) .............................. JP2017-014851
Nov. 14, 2017  (JP) .............................. JP2017-219345

(51) Int. Cl.
*H02N 2/16* (2006.01)
*G02B 7/02* (2021.01)
(Continued)

(52) U.S. Cl.
CPC .............. *H02N 2/163* (2013.01); *G02B 7/02* (2013.01); *H02N 2/0065* (2013.01); *H02N 2/103* (2013.01)

(58) Field of Classification Search
CPC ...... H02N 2/163; H02N 2/0065; H02N 2/103; H02N 2/04; H02N 2/0055; H02N 2/026;
(Continued)

(56) References Cited

U.S. PATENT DOCUMENTS

2011/0141584 A1* 6/2011 Henderson ............... H02N 2/22
                                                             359/811
2011/0255185 A1* 10/2011 Hashi ....................... G02B 7/08
                                                             359/824
(Continued)

FOREIGN PATENT DOCUMENTS

CN         104104265 A      10/2014
JP         2009-163017 A     7/2009
(Continued)

*Primary Examiner* — Emily P Pham
(74) *Attorney, Agent, or Firm* — Canon U.S.A., Inc., IP Division

(57) ABSTRACT

A driving device includes a vibrator; a friction member; a first guide portion that guides the vibrator or the friction member in a first direction when the vibrator vibrates so that the vibrator and the friction member move relative to each other, the first guide portion enabling rotation of the vibrator and the friction member around an axis in the first direction; a moving member that moves when the vibrator and the friction member move relative to each other, the moving member being connected to the member to be driven; and a second guide portion that guides the member to be driven in a second direction when the moving member moves. The moving member is connected to the member to be driven such that the moving member is rotatable and movable in a direction orthogonal to the first direction with respect to the member to be driven.

9 Claims, 9 Drawing Sheets

(51) Int. Cl.
*H02N 2/00* (2006.01)
*H02N 2/10* (2006.01)

(58) Field of Classification Search
CPC . H02N 2/12; H02N 2/14; H04N 5/225; G02B 7/02; G02B 7/04; G02B 7/08
See application file for complete search history.

(56) References Cited

U.S. PATENT DOCUMENTS

| | | | |
|---|---|---|---|
| 2017/0054387 A1* | 2/2017 | Sumioka | H02N 2/008 |
| 2017/0359002 A1* | 12/2017 | Morita | H02N 2/22 |
| 2019/0253631 A1* | 8/2019 | Moriya | G03B 3/10 |

FOREIGN PATENT DOCUMENTS

| | | |
|---|---|---|
| JP | 2014-212682 A | 11/2014 |
| JP | 2016-224143 A | 12/2016 |

* cited by examiner

DRIVING DEVICE, OPTICAL DEVICE, AND IMAGE PICKUP DEVICE

CROSS-REFERENCE TO RELATED APPLICATIONS

This application is a Continuation of International Patent Application No. PCT/JP2018/002485, filed Jan. 26, 2018, which claims the benefit of Japanese Patent Application No. 2017-014851 filed Jan. 30, 2017 and Japanese Patent Application No. 2017-219345 filed Nov. 14, 2017, both of which are hereby incorporated by reference herein in their entirety.

TECHNICAL FIELD

The present invention relates to a driving device including a vibration wave motor, an optical device, and an image pickup device.

BACKGROUND ART

An example of a known vibration wave motor is driven by pressing a vibrator that periodically vibrates in response to a high-frequency voltage applied thereto against a friction member and bringing the vibrator into frictional contact with the friction member. The vibration wave motor includes guide means used to extract driving force generated as a result of vibration of the vibrator in a predetermined direction. The vibrator and the friction member are guided to be movable with respect to each other along a single axis.

A lens barrel including an optical lens, which is a member to be driven by a vibration wave motor, also has guide means for enabling the optical lens to exert desired optical characteristics. The optical lens is guided to be movable only in an optical axis direction.

In this structure, due to variations in manufacture, there is a risk that the moving direction according to the guide means of the vibration wave motor and the moving direction according to the guide means of the lens barrel will not be parallel to each other and that the distance between the guide means will be different from a design value.

Japanese Patent Laid-Open No. 2014-212682 proposes a linear ultrasonic motor that absorbs a skew between the moving directions according to the guide means and an error in the distance between the guide means and that includes connecting means for providing connection without a clearance in the driving direction.

According to Japanese Patent Laid-Open No. 2014-212682, the guide means of the linear ultrasonic motor includes a one-axis guide portion that is constituted by two rolling balls and a V-groove and that serves as a rotatable guide, and a rotation restriction portion that restricts the rotational position of the one-axis guide portion.

Also, according to Japanese Patent Laid-Open No. 2014-212682, the guide means of the lens barrel includes a one-axis guide portion that is constituted by a guide shaft and two fitting holes and that serves as a rotatable guide, and a rotation restriction portion that restricts the rotational position of the one-axis guide portion.

The connecting means connects the linear ultrasonic motor and the lens barrel, whose rotations are restricted as described above, without a clearance in the driving direction while absorbing a skew between the moving directions according to the guide means and an error in the distance between the guide portions.

As described above, according to Japanese Patent Laid-Open No. 2014-212682, the linear ultrasonic motor and the lens barrel are connected while rotations thereof are restricted. Therefore, a large number of components are provided, and a lens barrel driving device including the vibration wave motor and the lens barrel is large in size.

SUMMARY OF INVENTION

To achieve the above-described object, a driving device according to the present invention includes a vibrator; a friction member that is in frictional contact with the vibrator; a first guide portion that guides the vibrator or the friction member in a first direction when the vibrator vibrates so that the vibrator and the friction member move relative to each other, the first guide portion enabling rotation of the vibrator and the friction member around an axis in the first direction; a moving member that moves when the vibrator and the friction member move relative to each other, the moving member being connected to the member to be driven; and a second guide portion that guides the member to be driven in a second direction when the moving member moves. The moving member is connected to the member to be driven such that the moving member is rotatable and movable in a direction orthogonal to the first direction with respect to the member to be driven.

Further features of the present invention will become apparent from the following description of exemplary embodiments with reference to the attached drawings.

DESCRIPTION OF EMBODIMENTS

Preferred embodiments of the present invention will now be described in detail with reference to the drawings.

First Embodiment

Figure 1:
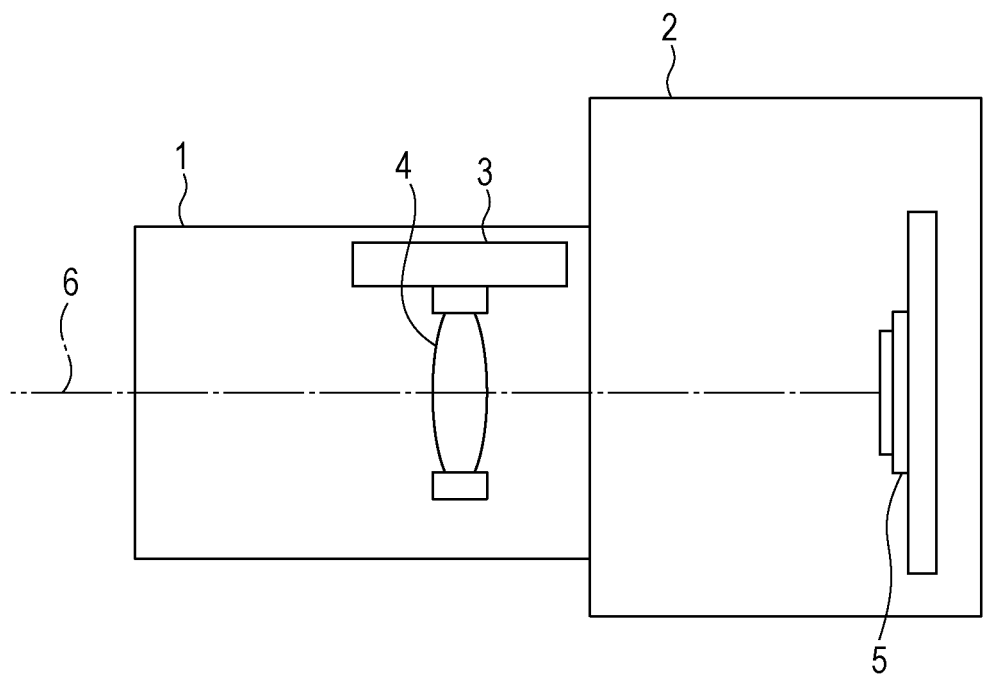
FIG. 1 illustrates the structure of an image pickup device according to embodiments of the present invention.
Figure 1:
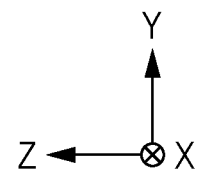

FIG. 1 illustrates the structure of an image pickup device according to a first embodiment of the present invention. Although an image pickup device including a vibration wave motor will be described in the present embodiment, the present invention may be applied to an optical device such as an interchangeable lens that can be detachably attached to the image pickup device. Although a member to be driven by the vibration wave motor is a lens holder in the present embodiment, the member to be driven by the driving device to which the present invention is applied is not limited to a lens holder. For example, the member to be driven may be included in a device other than an image pickup element or an image pickup device.

Referring to FIG. 1, the main body of the image pickup device includes an image pickup lens unit 1 and a camera body 2. An optical lens 4 is connected to a vibration wave motor 3 in the image pickup lens unit 1. When a movable member of the vibration wave motor 3 moves, the optical lens 4 moves in a direction parallel to the optical axis 6 (Z-axis direction). When the optical lens 4 is a focusing lens, the optical lens 4, which is a focusing lens, moves in a direction parallel to the optical axis 6 during focusing. An object image is formed at the position of the image pickup element 5 so that a focused image is formed. The optical lens 4 may be a zoom lens for changing an imaging angle of view.

Figure 2:
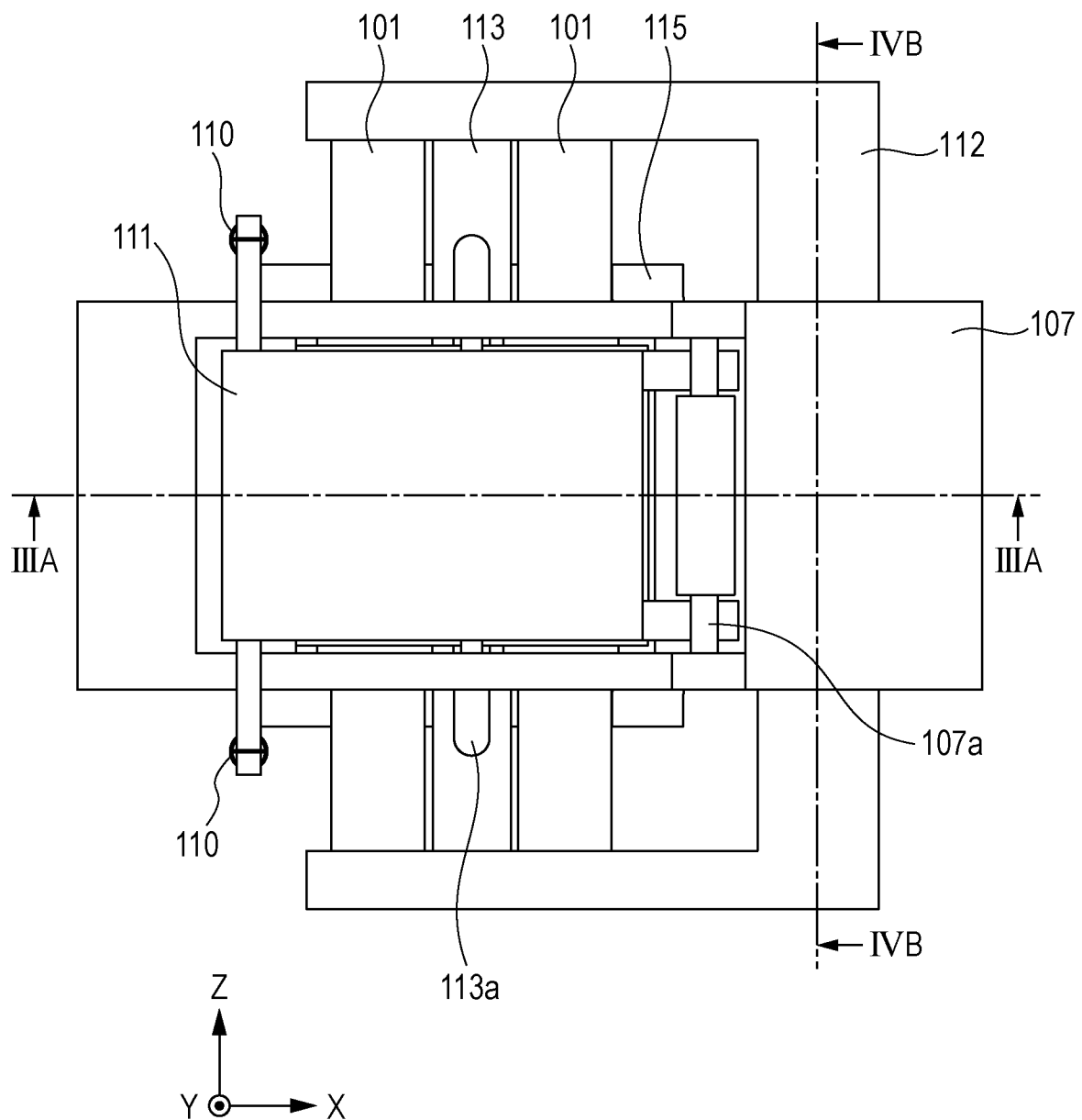
FIG. 2 is a top view of a vibration wave motor 3 according to a first embodiment of the present invention.
Figure 3A:
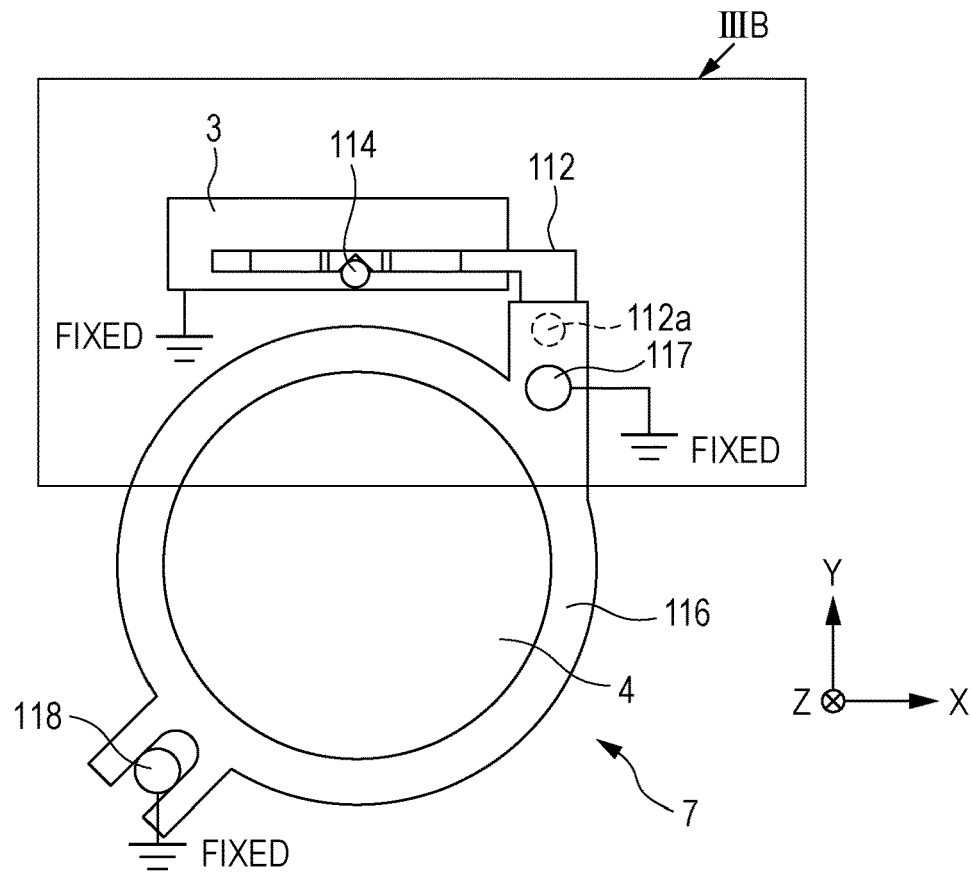
FIG. 3A illustrates the structure of a lens barrel driving device according to the first embodiment of the present invention.
Figure 3B:
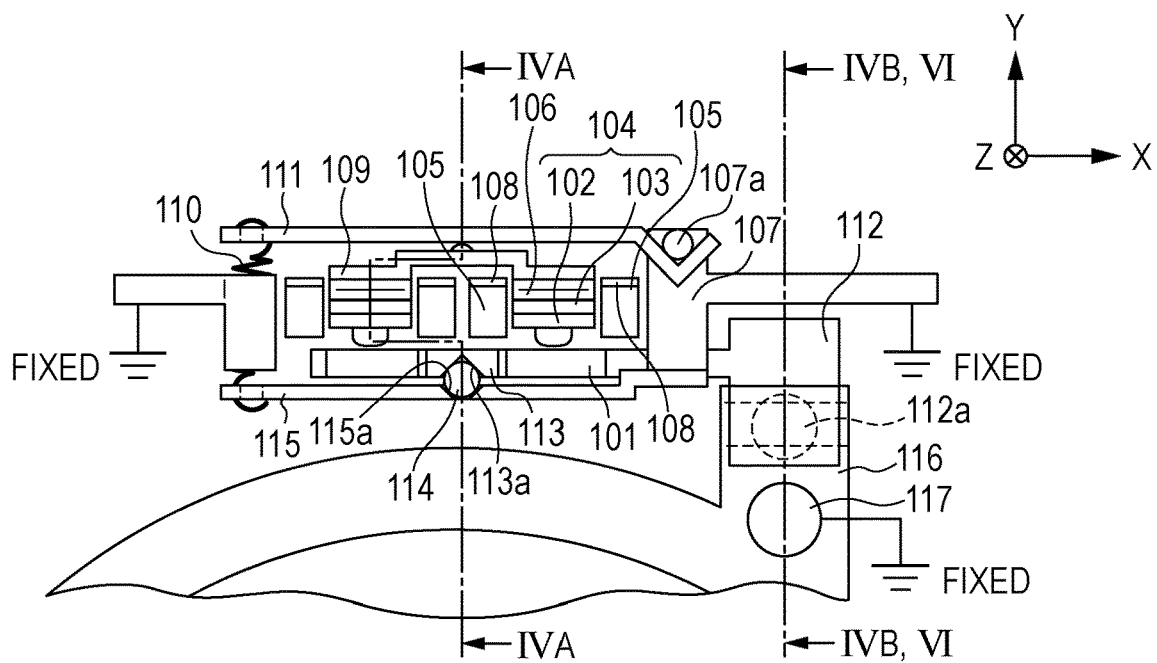
FIG. 3B illustrates the structure of the lens barrel driving device according to the first embodiment of the present invention.
Figure 4A:
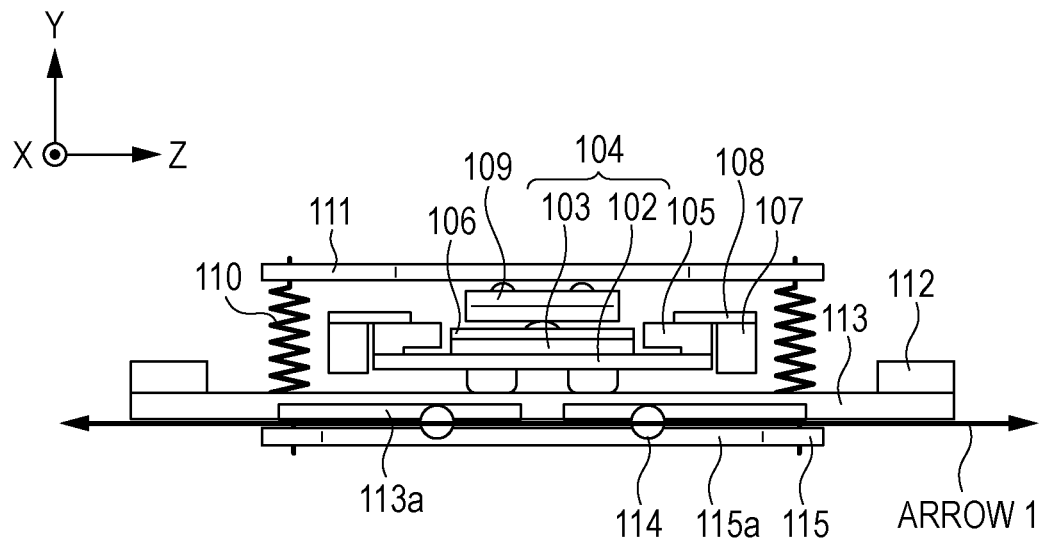
FIG. 4A is a sectional view of the vibration wave motor 3 according to the first embodiment of the present invention.
Figure 4B:
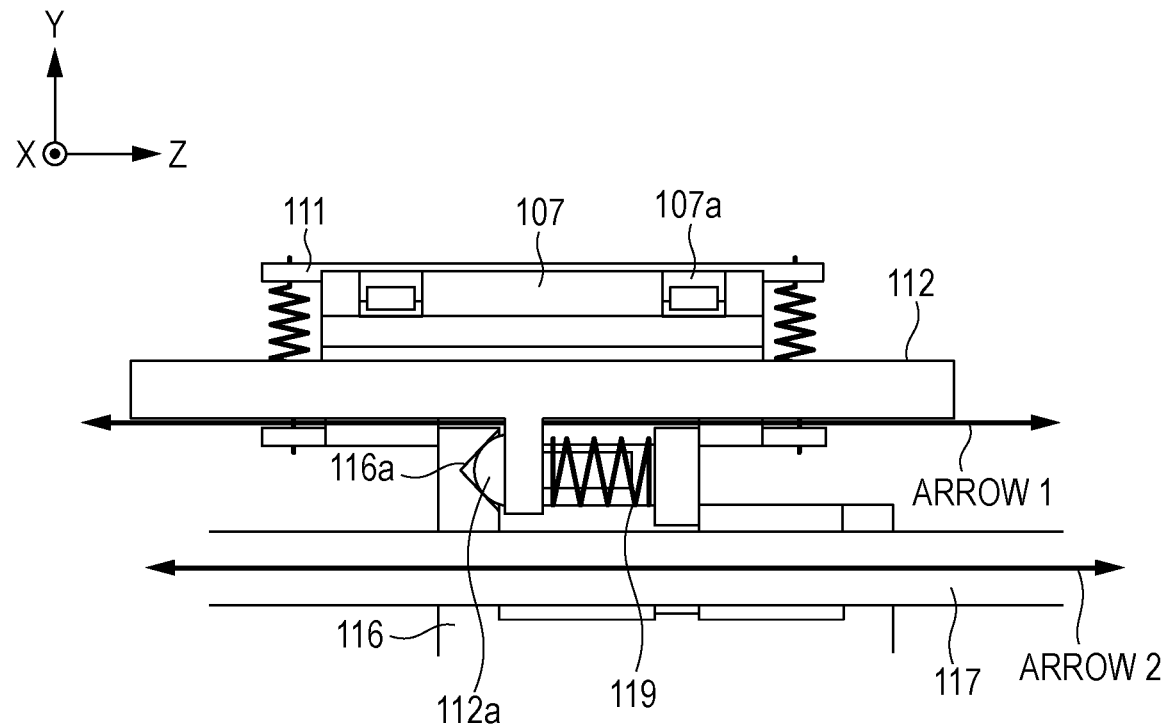
FIG. 4B is a sectional view of the vibration wave motor 3 according to the first embodiment of the present invention.

A lens barrel driving device according to the present embodiment will be described with reference to FIGS. 2, 3A, 3B, 4A, and 4B. FIG. 2 is a top view of the vibration wave motor 3 according to the present embodiment. FIGS. 3A and 3B illustrate the structure of the lens barrel driving device according to the present embodiment. FIG. 3A is an X-Y cross section of the lens barrel driving device according to the present embodiment including the vibration wave motor 3 and a lens barrel 7, and the vibration wave motor 3 is shown as a sectional view taken along line IIIA-IIIA in FIG. 2. FIG. 3B is an enlarged view of the vibration wave motor 3 in FIG. 3A. FIGS. 4A and 4B illustrate the structure of the lens barrel driving device according to the present embodiment. FIG. 4A is a sectional view taken along line IVA-IVA in FIG. 3B, and FIG. 4B is a sectional view taken along line IVB,VI-IVB,VI in FIGS. 2 and 3B.

Vibrators 104 each include a vibration plate 102, which is an elastic metal vibrating body, and a piezoelectric element 103. The vibration plate 102 and the piezoelectric element 103 are fixed together by, for example, a known adhesive. The piezoelectric element 103 excites supersonic vibration when a voltage is applied thereto.

The vibrators 104 are fixed to a first holder 105 by, for example, a known adhesive. However, another known technology, such as screws, may be used as long as the vibrators 104 are fixed to the first holder 105. A second holder 107 is connected to the first holder 105 by a thin metal plate 108.

As stated "fixed" in FIGS. 3A and 3B, the second holder 107 is fixed to a fixing member (not illustrated). Friction members 101 and a moving rail member 113 are fixed to a moving frame member 112 by a known technology, such as screws.

As illustrated in FIGS. 4A and 4B, two springs 110 are retained between an upper pressing plate 111 and a fixed rail member 115 at different positions in the optical axis direction (Z-axis direction). The springs 110 apply a pressing force that brings the vibrators 104 and the friction members 101 into frictional contact with each other.

In the present embodiment, two sets which each include one vibrator 104 and one friction member 101 are provided. The two sets which each include one vibrator 104 and one friction member 101 are arranged in the X-axis direction. However, the number of sets which each include one vibrator 104 and one friction member 101 may instead be one or three or more.

The upper pressing plate 111 is engaged with the second holder 107 such that the upper pressing plate 111 is rotatable around engagement portions 107a of the second holder 107. The upper pressing plate 111 rotates around the engagement portions 107a so that a tensile force applied by the springs 110 is transmitted to a lower pressing plate 109, which is in contact therewith, as a pressing force. The lower pressing plate 109 is disposed above the two vibrators 104. Elastic members 106 are disposed between the lower pressing plate 109 and the piezoelectric elements 103 included in the vibrators 104. The elastic members 106 prevent pressing portions of the lower pressing plate 109 and the piezoelectric elements 103 from coming into direct contact with each other, thereby preventing damage to the piezoelectric elements 103.

The second holder 107 and the fixed rail member 115 are fixed together by, for example, screws (not illustrated). However, the fixing method is not particularly limited as long as the second holder 107 and the fixed rail member 115 are fixed together. The fixed rail member 115 includes two V-groove-shaped fixed guide portions 115a that are arranged in the Z-axis direction. Rolling balls 114, which are ball members, are arranged to be in contact with the inner surfaces of the respective grooves. The moving rail member 113 also has two V-groove-shaped moving guide portions 113a that are arranged in the Z-axis direction. The rolling balls 114 are retained between the moving guide portions 113a of the moving rail member 113 and the fixed guide portions 115a of the fixed rail member 115. A groove portion in which the rolling balls 114 are disposed may be two grooves as described above, or a single groove obtained by connecting two grooves. This also applies to the moving guide portions 113a.

The moving guide portions 113a, the fixed guide portions 115a, and the rolling balls 114 are disposed between the two vibrators in a direction in which the vibrators 104 are arranged (X-axis direction).

The above-described structure enables the moving rail member 113 to rotate around an axis that connects the two rolling balls 114 (Z axis) with respect to the fixed guide portion 115. When the moving rail member 113 rotates with respect to the fixed guide portion 115, the moving frame member 112 and the friction members 101, which are fixed to the moving rail member 113, also rotate with respect to the fixed guide portion 115. When the friction members 101 rotate with respect to the fixed guide portion 115, the vibrators 104 and the lower pressing plate 109, which are in pressure contact with the friction members 101, rotate with respect to the fixed guide portion 115. The first holder 105, to which the vibrators 104 are fixed, is connected to the second holder 107 by the thin metal plate 108. The rotation of the first holder 105 is absorbed by elasticity of the thin metal plate 108. Therefore, even when the moving rail member 113 rotates with respect to the fixed guide portion 115, the second holder 107 does not rotate.

The moving frame member 112 is a moving member that moves when the vibrators 104 and the friction members 101 move with respect to each other, and includes a connecting portion 112a that is connected to the lens holder 116. More specifically, the lens holder 116 holds the optical lens 4, and is engaged with a first guide bar 117 so that the lens holder 116 is guided straight in the Z-axis direction. As stated "fixed" in FIGS. 3A and 3B, the first guide bar 117 is fixed to a fixing member (not illustrated). The lens holder 116 has a long hole to which a second guide bar 118, which is a rotation restriction member, is engaged. Similarly, as stated "fixed" in FIGS. 3A and 3B, the second guide bar 118 is also fixed to a fixing member (not illustrated). Thus, rotation of the direction in which the lens holder 116 is moved is restricted, and the lens holder 116 is guided straight in the Z-axis direction without being rotated. The optical lens 4, the lens holder 116, the first guide bar 117, and the second guide bar 118 form the lens barrel 7.

The vibration plates 102 include contact portions, and the contact portions are in contact with and pressed against the friction members 101 by a pressing force of the springs 110. When a driving voltage is applied to each piezoelectric element 103, ultrasonic vibration is excited and the vibrators 104 resonate. At this time, two types of standing waves are generated in the vibrators 104, and substantially elliptical movements of the contact portions of the vibration plates 102 occur. When the vibration plates 102 and the friction members 101 are in pressure contact with each other, the elliptical movements of the vibrators 104 are efficiently transmitted to the friction members 101. As a result, the friction members 101, the moving rail member 113, and the moving frame member 112 move in the Z-axis direction. The lens holder 116 and the optical lens 4, which are connected to the moving frame member 112, also move as the moving frame member 112 moves.

As illustrated in FIG. 4A, each vibration plate 102 has two contact portions that are in contact with the corresponding friction member 101 and arranged in the Z-axis direction, and each of the two contact portions performs the above-described substantially elliptical movement. The thin metal plate 108 connects the first holder 105 to the second holder 107. The moving guide portions 113a of the moving rail member 113 and the fixed guide portions 115a of the fixed rail member 115 extend in the Z-axis direction, and the rolling balls 114 are capable of rolling in the Z-axis direction. As described above, the moving guide portions 113a, the fixed guide portions 115a, and the rolling balls 114 guide the moving frame member 112 in the direction indicated by arrow 1 (first direction).

As illustrated in FIG. 4B, the connecting portion 112a of the moving frame member 112 has the shape of a spherical projection that convexly projects in the Z-axis direction. The lens holder 116 has a connecting portion that is V-groove-shaped and extends in the X-axis direction. The direction in which the V-groove-shaped connecting portion 116a extends is orthogonal to the direction indicated by arrow 1 in FIG. 4A, and is also orthogonal to the direction in which the vibrators 104 and the friction members 101 are in contact with each other. The connecting-portion urging spring 119 generates an urging force that urges the moving frame member 112 and the lens holder 116 against each other in the Z-axis direction at the connecting portion 112a. Thus, the moving frame member 112 and the lens holder 116 are connected to each other without a clearance in the Z-axis direction.

As illustrated in FIG. 4B, the first guide bar 117 extends in a direction indicated by arrow 2 (second direction), which is substantially the same as the direction indicated by arrow 1, and guides the lens holder 116 in the direction indicated by arrow 2. As described above, due to variations in manufacture, a skew between the direction indicated by arrow 1 and the direction indicated by arrow 2 may occur, and the distance between the guide axis defined by the moving guide portions 113a and the fixed guide portions 115a and the first guide bar 117 may differ from the design value. Therefore, according to the present embodiment, the moving frame member 112 and the lens holder 116 are connected to each other by the connecting portion 112a of the moving frame member 112 having the shape of a spherical projection and the V-groove-shaped connecting portion 116a of the lens holder 116. This connecting mechanism enables absorption of a skew between the guide axis along which the movement of the moving frame member 112 is guided and the guide axis along which the movement of the lens holder 116 is guided and an error in the distance between the axes, and a reduction in a clearance between the moving frame member 112 and the lens holder 116 in the moving direction.

As illustrated in FIG. 3B, the vibration wave motor 3 according to the present embodiment includes a first guide portion constituted by the moving guide portions 113a, the fixed guide portions 115a, and the rolling balls 114. The first guide portion guides a movement substantially in the Z-axis direction and enables a rotation substantially around the Z axis. In addition, as illustrated in FIG. 4B, the moving frame member 112 is connected to the lens holder 116, which is guided in a direction substantially parallel to the moving direction of the vibration wave motor 3, by the first guide bar 117, which is a second guide portion. Thus, the rotation substantially around the Z axis is restricted.

As described above, a vibration wave motor and a lens holder according to the related art are each provided with a guide portion and a rotation restriction portion to enable straight movement and restrict rotation. In contrast, according to the present embodiment, rotation of the vibration wave motor is restricted by connecting the vibration wave motor to the lens holder. Therefore, according to the present embodiment, the number of components is less than that of the structure according to the related art. As a result, the size of the lens barrel driving device can be reduced, and the vibration wave motor and the lens barrel can be appropriately moved.

The manner in which a skew between the axis of the first guide portion and the axis of the second guide portion and an error in the distance between the axes are absorbed will be described with reference to FIGS. 5A, 5B, and 6.

Figure 5A:
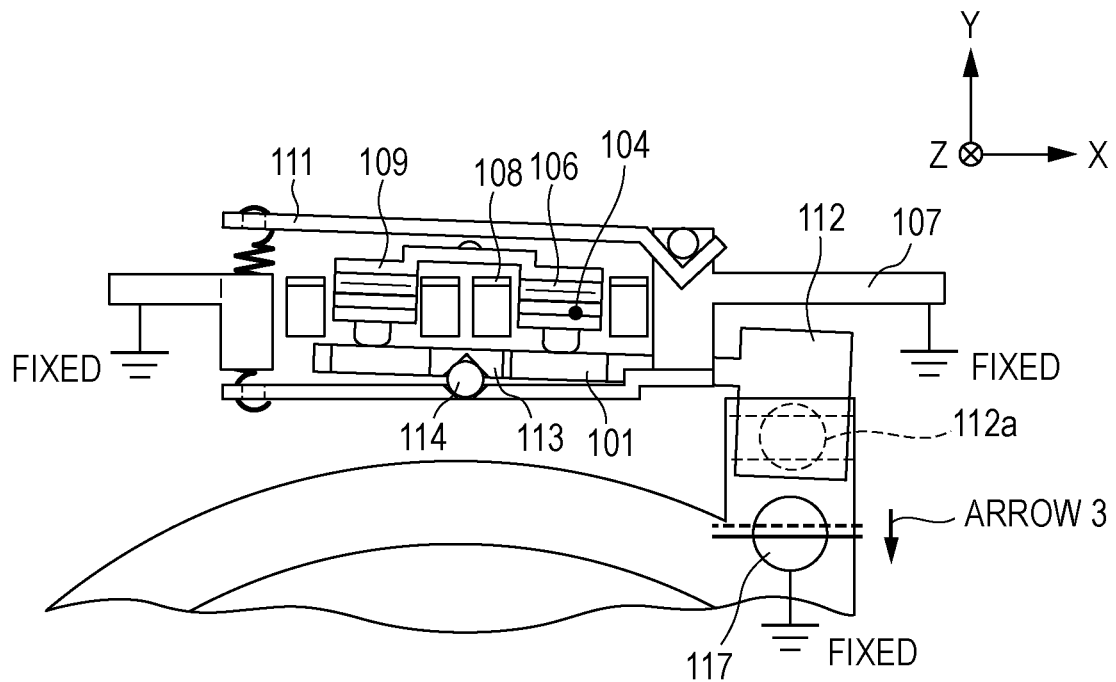
FIG. 5A illustrates the movement of a moving frame 112 and a lens holder 116 according to the first embodiment of the present invention.
Figure 5B:
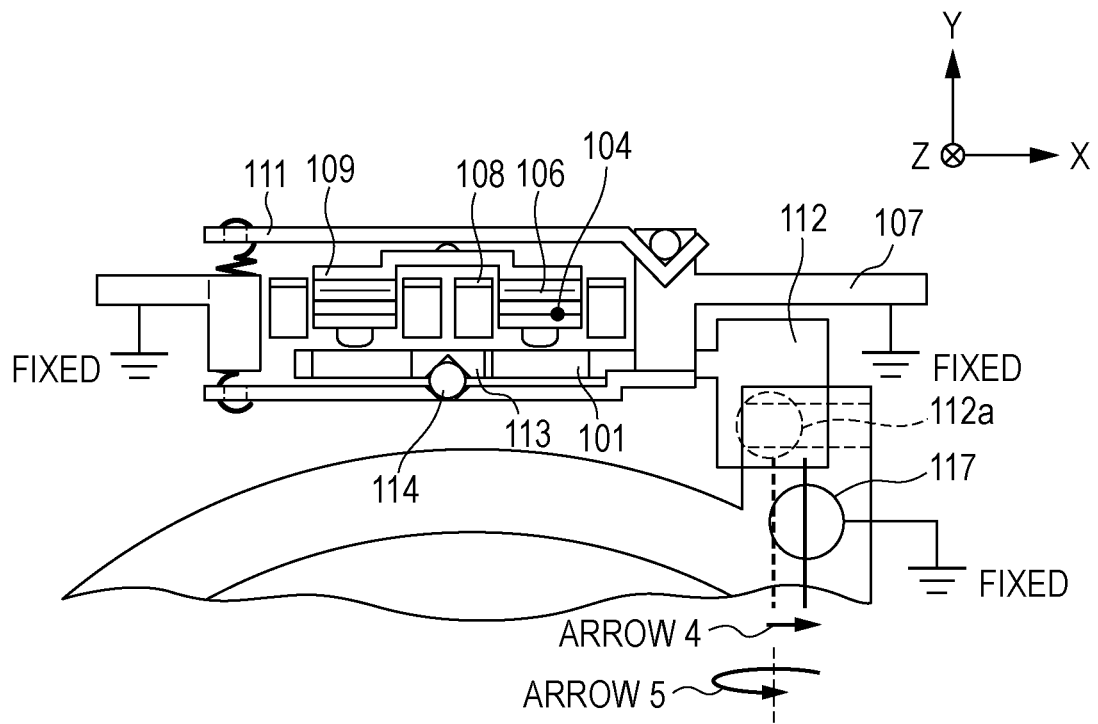
FIG. 5B illustrates the movement of the moving frame 112 and the lens holder 116 according to the first embodiment of the present invention.
Figure 6:
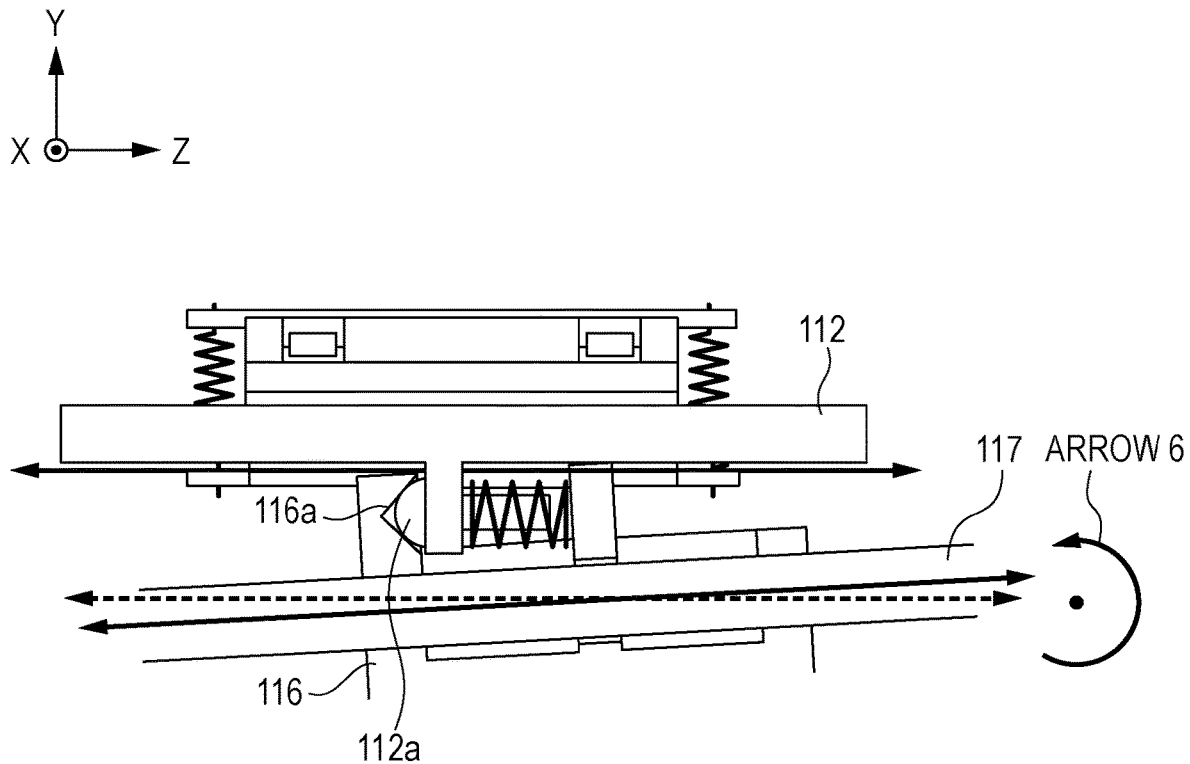
FIG. 6 illustrates the movement of the moving frame 112 and the lens holder 116 according to the first embodiment of the present invention.

FIGS. 5A and 5B show enlarged views of the vibration wave motor 3 in the X-Y cross section of the lens barrel driving device, and FIG. 6 is a sectional view taken along line IVB,VI-IVB,VI in FIG. 3B.

FIG. 5A shows the case in which the position at which the first guide bar 117 is fixed is shifted in the direction of arrow 3 due to variations in manufacture and the distance between the axis of the first guide portion and the axis of the second guide portion has an error in the Y-axis direction. Since the position of the connecting portion 116a is determined by the position of the first guide bar 117, the position at which the connecting portions 112a and 116a are connected to each other is shifted further in the direction of arrow 3 than in the case without variations in manufacture. Accordingly, the moving frame member 112 rotates clockwise around the rolling balls 114 in the figure. The V-groove of the connecting portion 116a extends in the X-axis direction. Therefore, displacement of the connecting portion 112a in the X-axis direction due to rotation of the moving frame member 112 around the rolling balls 114 is absorbed, and the state in which the connecting portion 112a and the connecting portion 116a are stably connected to each other can be maintained. When the moving frame member 112 rotates, the friction members 101 fixed to the moving frame member 112 also rotate. Accordingly, the vibrators 104 and the elastic members 106 that are pressed against the friction members 101, the lower pressing plate 109, and the upper pressing plate 111 also rotate. Therefore, the state in which the vibrators 104 and the friction members 101 are in pressure contact with each other can be maintained.

Although an absorption operation for a displacement in the direction of arrow 3 is described with reference to FIG. 5A, also when the direction of displacement is opposite to the direction of arrow 3, a similar absorption operation may be performed except that the moving frame member 112 rotates counterclockwise. In the following description of absorption operations with reference to FIGS. 5B and 6 in which directions of shifts and rotations are shown by arrows, displacements in the opposite direction can be absorbed by a similar operation, and description thereof is thus omitted.

As described above, according to the present embodiment, the moving frame member 112 is rotatable around the Z axis, and the moving frame member 112 and the lens holder 116 are connected to each other such that the moving frame member 112 and the lens holder 116 are translatable in the Y-axis direction. Accordingly, an error in the distance between the axis of the first guide portion and the axis of the second guide portion in the Y-axis direction can be absorbed.

FIG. 5B shows the case in which the position at which the first guide bar 117 is fixed is shifted in the direction of arrow 4 due to variations in manufacture and the distance between the axes of the first guide portion and the second guide portion has an error in the X-axis direction. As described above, the V-groove of the connecting portion 116a extends in the X-axis direction. Therefore, an error in the distance between the axis of the first guide portion and the axis of the second guide portion in the X-axis direction is absorbed and the state in which the connecting portion 112a and the connecting portion 116a are stably connected to each other can be maintained.

Next, a case in which the orientation in which the first guide bar 117 is fixed is skewed around the Y axis with respect to the guiding direction of the first guide portion as indicated by arrow 5 due to variations in manufacture will be described with reference to FIG. 5B. The skew around the Y axis is equal to an error in the distance between the axis of the first guide portion and the axis of the second guide portion in the X-axis direction at each position in the Z direction when the lens holder 116 moves in the second direction, that is, substantially in the Z direction. Therefore, the error can be absorbed by the above-described translation in the X-axis direction.

As described above, according to the present embodiment, the moving frame member 112 and the lens holder 116 are connected to each other such that the moving frame member 112 and the lens holder 116 are translatable in the X-axis direction and rotatable around the Y axis. Accordingly, an error in the distance between the axis of the first guide portion and the axis of the second guide portion in the X-axis direction and a skew around the Y-axis can be absorbed.

FIG. 6 shows the case in which the relative positions of both ends of the first guide bar 117 in the Z-axis direction are shifted in the Y-axis direction due to variations in manufacture so that the orientation in which the first guide bar 117 is fixed is skewed around the X axis with respect to the guiding direction of the first guide portion as indicated by arrow 6. The moving frame member 112 and the lens holder 116 are connected to each other by the connecting portion 112a having the shape of a spherical projection and the V-groove of the connecting portion 116a, and are rotatable around an axis in the X-axis direction as described above. Therefore, a skew around the X axis can be absorbed, and the state in which the connecting portion 112a and the connecting portion 116a are stably connected to each other can be maintained.

As described above, according to the present embodiment, the moving frame member 112 and the lens holder 116 are connected such that the moving frame member 112 and the lens holder 116 are rotatable around the X axis. Accordingly, the skew between the axis of the first guide portion and the axis of the second guide portion around the X axis can be absorbed.

According to the present embodiment, the moving frame member 112 has the connecting portion 112a having a spherical shape, and the lens holder 116 has the V-groove-shaped connecting portion 116a. Alternatively, however, the moving frame member 112 may have a V-groove-shaped connecting portion, and the lens holder 116 may have a spherical connecting portion. The shapes of the connecting portions are not limited as long as the moving frame member 112 and the lens holder 116 are movable with respect to each other in the direction orthogonal to the moving direction of the vibration wave motor 3 and are rotatable with respect to each other around axes in two directions, which are the moving direction of the vibration wave motor 3 and the direction orthogonal to the moving direction.

According to the present embodiment, the friction members 101 move and the moving frame member 112 is fixed to the friction members 101. Alternatively, however, the vibrators 104 may move and the moving frame member 112 may be fixed to the vibrators 104 or a member fixed to the vibrators 104. More specifically, as long as the vibrators 104 and the friction members 101 move relative to each other, the configuration thereof may be either such that the vibrators 104 move while the friction members 101 are fixed, or such that the friction members 101 move while the vibrators 104 are fixed.

Second Embodiment

A second embodiment will be described with reference to FIGS. 7 to 10. In the second embodiment, an example in which a single set including a vibrator and a friction member is provided and in which the vibrator moves will be described in detail. According to the present embodiment, elements that are the same as those in the first embodiment are denoted by the same reference numerals, and detailed description thereof is omitted.

Figure 7:
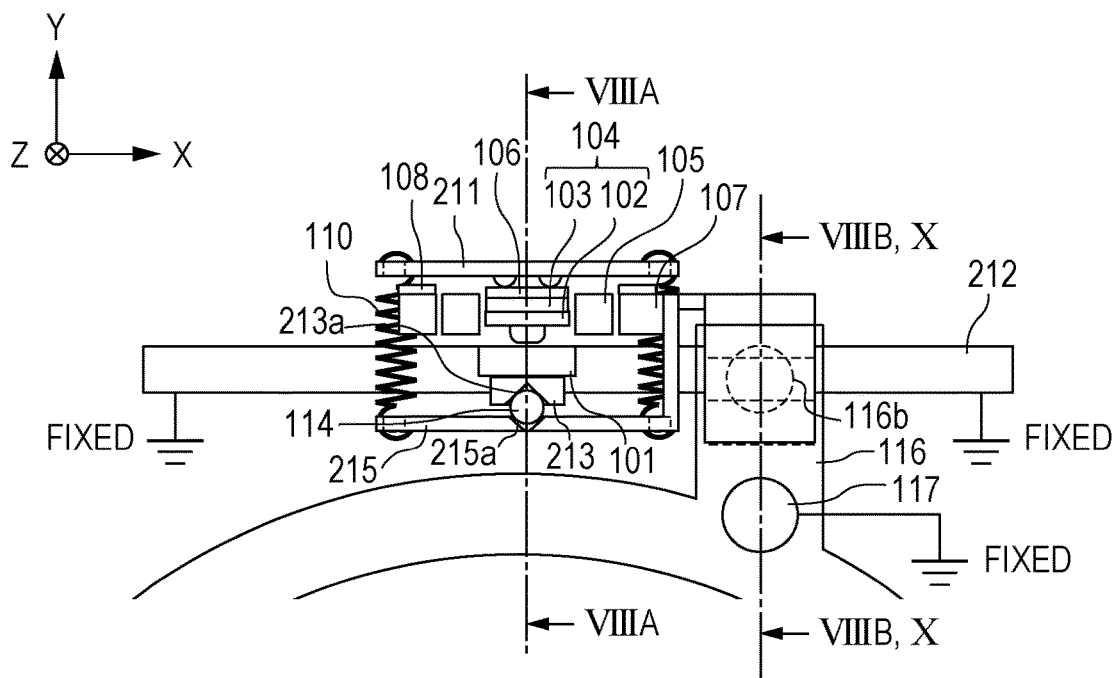
FIG. 7 illustrates the structure of a lens barrel driving device according to a second embodiment of the present invention.

FIG. 7 is an X-Y cross section of a lens barrel driving device according to the present embodiment including a vibration wave motor 3 and a lens barrel 7.

According to the present embodiment, a second holder is not fixed to a fixing member (not illustrated). Springs 110 connect a pressing plate 211 and a moving rail member 215 to each other at four positions and apply a pressing force that brings the vibrator 104 and the friction member 101 into frictional contact with each other. A base member 212 that is fixed to the fixing member (not illustrated) holds the friction member 101 and a fixed rail member 213.

An elastic member 106 is disposed between the pressing plate 211 and a piezoelectric element 103 included in the vibrator 104.

The second holder 107 and the moving rail member 215 are fixed together by a known technology, such as screws. The moving rail member 215 includes two moving guide portions 215a that are V-grooves arranged in the Z direction. Each groove has a rolling ball 114 disposed therein. The fixed rail member 213 also has two moving guide portions 213a that are grooves arranged in the Z direction. The rolling balls 114 are retained between the fixed guide portions 213a of the fixed rail member 213 and the moving guide portions 215a of the moving rail member 215. Thus, the moving rail member 215 is guided in the Z direction such that the moving rail member 215 is rotatable with respect to the moving guide portions 215a around an axis (Z axis) that connects the two rolling balls 114.

The moving rail member 215 is connected to a lens holder 116 at a connecting portion 215c for the lens holder. The lens holder 116 is engaged with a first guide bar 117 so that the lens holder 116 is guided straight in the Z-axis direction in a rotatable manner. As stated "fixed" in the figure, the first guide bar 117 is fixed to a fixing member (not illustrated). The lens holder 116 has a long hole to which a second guide bar 118, which is a lens-holder rotation restriction member, is engaged. Similarly, as stated "fixed" in the figure, the second guide bar 118 is also fixed to a fixing member (not illustrated). Thus, rotation of the lens holder 116 is restricted, so that the lens holder 116 is guided straight in the Z-axis direction without being rotated.

According to the present embodiment, the relationship between the fixing members and the moving members is opposite to that in the first embodiment, and the vibrator 104, the second holder 107, and the moving rail member 215 are moved. The lens holder 116 and the optical lens 4, which are connected to the moving rail member 215, are also moved together.

Figure 8A:
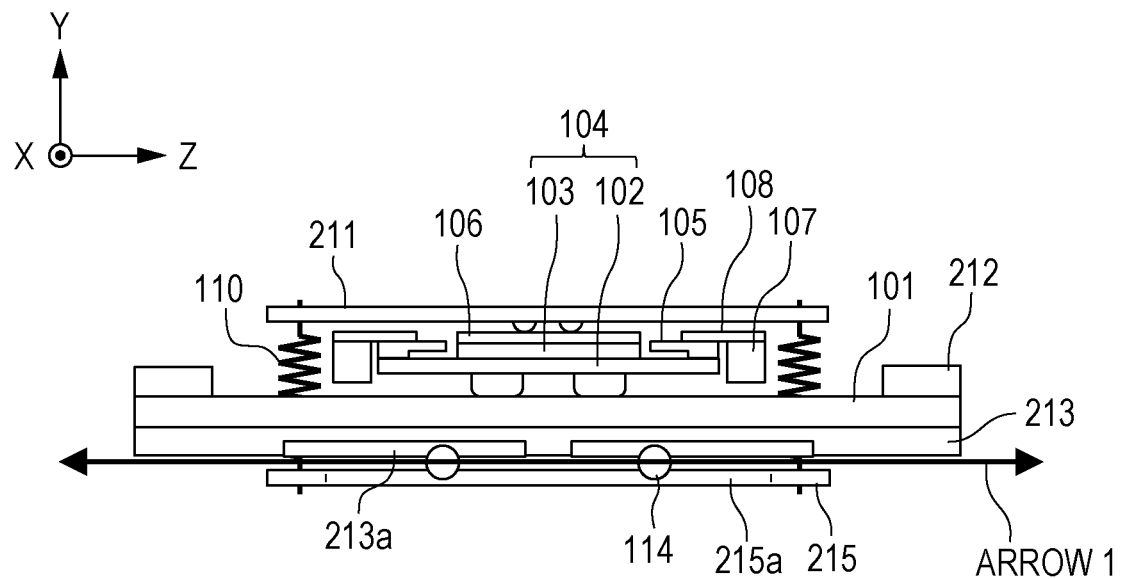
FIG. 8A is a sectional view of a vibration wave motor 3 according to the second embodiment of the present invention.
Figure 8B:
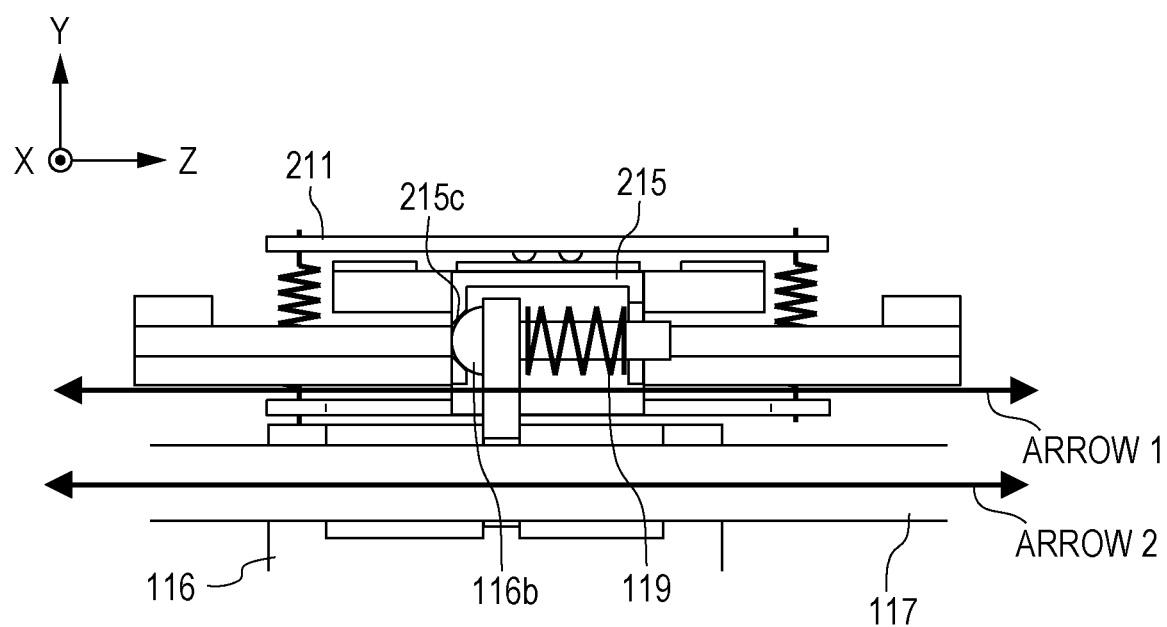
FIG. 8B is a sectional view of the vibration wave motor 3 according to the second embodiment of the present invention.

FIGS. 8A and 8B show sectional views of the vibration wave motor 3 according to the present embodiment. FIG. 8A is a sectional view taken along line VIIIA-VIIIA in FIG. 7, and FIG. 8B is a sectional view taken along line VIIIB,X-VIIIB,X in FIG. 7.

As illustrated in FIG. 8A, the vibration plate 102 has two contact portions that are in contact with the friction member 101 and arranged in the Z-axis direction, and each of the two contact portions performs the above-described substantially elliptical movement. A thin metal plate 108 connects the first holder 105 to the second holder 107. The moving guide portions 213a, which are V-grooves, of the fixed rail member 213 and the moving guide portions 215a, which are also V-grooves, of the moving rail member 215 extend in the Z-axis direction, and the rolling balls 114 are capable of rolling in the Z-axis direction.

As illustrated in FIG. 8B, the connecting portion 116b of the lens holder 116 has the shape of a spherical projection that projects in the Z-axis direction. The connecting portion 215c of the moving rail member 215 that comes into contact with the lens holder 116 is a V-groove portion that extends in the X-axis direction. The connecting-portion urging spring 119 generates an urging force that urges the moving rail member 215 and the lens holder 116 against each other in the Z-axis direction at the connecting portion. Thus, the moving rail member 215 and the lens holder 116 are connected to each other without a clearance in the Z-axis direction.

As illustrated in FIG. 8B, the first guide bar 117 extends in a direction indicated by arrow 1 that is substantially the same as the first direction, and guides the lens holder 116. According to the present embodiment, a first guide portion and a second guide portion are provided. The first guide portion is constituted by the guide portions 213a and 215a and the rolling balls 114, and guides a movement substantially in the Z-axis direction in a rotatable manner. The second guide portion is constituted by the first guide bar 117.

The manner in which a skew between the axis of the first guide portion and the axis of the second guide portion and an error in the distance between the axes are absorbed will be described with reference to FIGS. 9A, 9B, and 10.

Figure 9A:
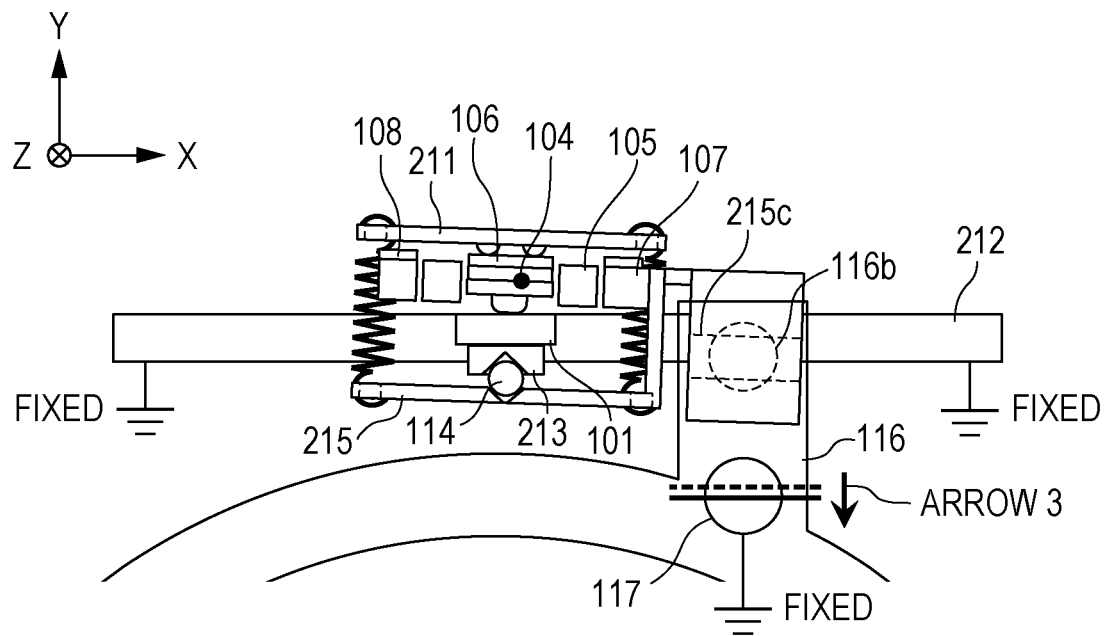
FIG. 9A illustrates the movement of a moving frame 112 and a lens holder 116 according to the second embodiment of the present invention.
Figure 9B:
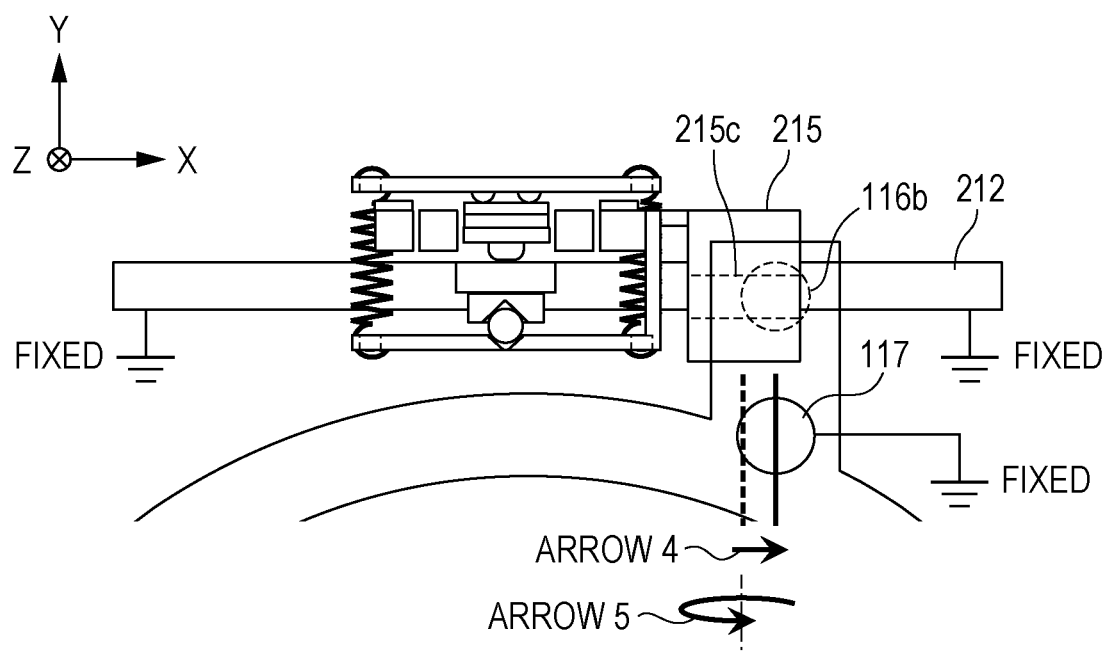
FIG. 9B illustrates the movement of the moving frame 112 and the lens holder 116 according to the second embodiment of the present invention.
Figure 10:
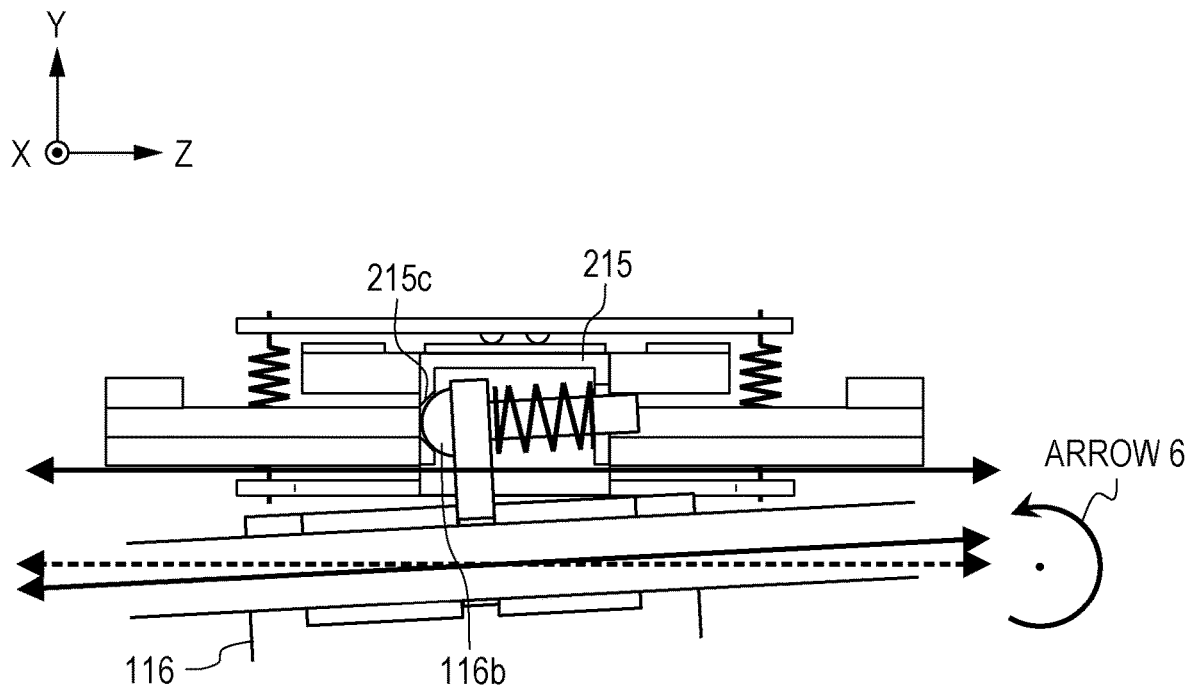
FIG. 10 illustrates the movement of the moving frame 112 and the lens holder 116 according to the second embodiment of the present invention.

FIGS. 9A, 9B, and 10 illustrate the movement of the moving frame 112 and the lens holder 116. FIGS. 9A and 9B show enlarged views of the vibration wave motor 3 in the X-Y cross section of the lens barrel driving device, and FIG. 10 is a sectional view taken along line VIIIB,X-VIIIB,X in FIG. 7.

FIG. 9A shows the case in which the position at which the first guide bar 117 is fixed is shifted in the direction of arrow 3 due to variations in manufacture and the distance between the axis of the first guide portion and the axis of the second guide portion has an error in the Y-axis direction. Since the position of the connecting portion 116b is determined by the position of the first guide bar 117, the position at which the connecting portions 215c and 116b are connected to each other is shifted further in the direction of arrow 3 than in the case without variations in manufacture. Accordingly, the moving rail member 215 rotates clockwise around the rolling balls 114 in the figure.

The connecting portion 215c extends in the X-axis direction. Therefore, displacement of the connecting portion 215c in the X-axis direction due to rotation of the moving rail member 215 around the rolling balls 114 is absorbed, and the state in which the connecting portion 215c and the connecting portion 116b are stably connected to each other can be maintained. When the moving rail member 215 rotates, the vibrator 104 fixed to the moving rail member 215 also rotates. Accordingly, the friction member 101 that is pressed against the vibrator 104, the first holder 105, the elastic member 106, the second holder 107, the thin metal plate 108, and the pressing plate 211 also rotate and the pressure contact state is maintained.

Although an absorption operation for a displacement in the direction of arrow 3 is described with reference to FIG. 9A, also when the direction of displacement is opposite to the direction of arrow 3, a similar absorption operation may be performed except that the moving rail member 215 rotates counterclockwise. In the following description of absorption operations with reference to FIGS. 9B and 10 in which directions of shifts and rotations are shown by arrows, displacements in the opposite direction can be absorbed by a similar operation, and description thereof is thus omitted.

As described above, according to the present embodiment, the moving rail member 215 is rotatable around the Z axis, and the moving rail member 215 and the lens holder 116 are connected to each other such that the moving rail member 215 and the lens holder 116 are translatable in the Y-axis direction. Accordingly, an error in the distance between the axis of the first guide portion and the axis of the second guide portion in the Y-axis direction can be absorbed.

FIG. 9B shows the case in which the position at which the first guide bar 117 is fixed is shifted in the direction of arrow 4 due to variations in manufacture and the distance between the axes of the first guide portion and the second guide portion has an error in the X-axis direction. As described above, the V-groove of the connecting portion 215c extends in the X-axis direction. Therefore, an error in the distance between the axis of the first guide portion and the axis of the second guide portion in the X-axis direction is absorbed and the state in which the connecting portion 215c and the connecting portion 116b are stably connected to each other can be maintained.

Next, a case in which the orientation in which the first guide bar 117 is fixed is skewed around the Y axis with respect to the guiding direction of the first guide portion as indicated by arrow 5 due to variations in manufacture will be described with reference to FIG. 9B. The skew around the Y axis is equal to an error in the distance between the axis of the first guide portion and the axis of the second guide portion in the X-axis direction at each position in the Z direction when the lens holder 116 moves in the second direction, that is, substantially in the Z direction. Therefore, the error can be absorbed by the above-described translation in the X-axis direction.

As described above, according to the present embodiment, the moving rail member 215 and the lens holder 116 are connected to each other such that the moving rail member 215 and the lens holder 116 are translatable in the X-axis direction and rotatable around the Y axis. Accordingly, an error in the distance between the axis of the first guide portion and the axis of the second guide portion in the X-axis direction and a skew around the Y-axis can be absorbed.

FIG. 10 shows the case in which the relative positions of both ends of the first guide bar 117 in the Z-axis direction are shifted in the Y-axis direction due to variations in manufacture so that the orientation in which the first guide bar 117 is fixed is skewed around the X axis with respect to the guiding direction of the first guide portion as indicated by arrow 6. The moving rail member 215 and the lens holder 116 are connected to each other by the connecting portion 116b having the shape of a spherical projection and the V-groove of the connecting portion 215c, and are rotatable around an axis in the X-axis direction as described above. Therefore, a skew around the X axis can be absorbed, and the state in which the connecting portion 116b and the connecting portion 215c are stably connected to each other can be maintained.

As described above, according to the present embodiment, the moving rail member 215 and the lens holder 116 are connected such that the moving rail member 215 and the lens holder 116 are rotatable around the X axis. Accordingly, the skew between the axis of the first guide portion and the axis of the second guide portion around the X axis can be absorbed.

According to the present embodiment, the lens holder 116 has the connecting portion 116b having a spherical shape, and the moving rail member 215 has the V-groove-shaped connecting portion 215c. Alternatively, however, the lens holder 116 may have a V-groove-shaped connecting portion, and the moving rail member 215 may have a spherical connecting portion. The shapes of the connecting portions are not limited as long as the moving rail member 215 and the lens holder 116 are movable with respect to each other in the direction orthogonal to the moving direction of the vibration wave motor 3 and are rotatable with respect to each other around axes in two directions, which are the moving direction of the vibration wave motor 3 and the direction orthogonal to the moving direction.

The present invention is not limited to the above-described embodiments, and various changes and modifications are possible without departing from the spirit and scope of the present invention. The following claims are appended to make public the scope of the present invention.

The present invention provides a driving device capable of appropriately moving a vibration wave motor and a member to be driven without increasing the overall size of the driving device.

The invention claimed is:

1. A driving device comprising:
   a vibrator;
   a friction member that is in frictional contact with the vibrator;
   a first guide portion that guides the vibrator or the friction member in a first direction when the vibrator vibrates so that the vibrator and the friction member move relative to each other, the first guide portion enabling rotation of either one of the vibrator or the friction member which moves around an axis in the first direction;
   a moving member that moves when the vibrator and the friction member move relative to each other, the moving member being connected to a member to be driven; and
   a second guide portion that guides the member to be driven in a second direction when the moving member moves,
   wherein the moving member is connected to the member to be driven such that the moving member is rotatable and movable in a direction orthogonal to the first direction with respect to the member to be driven.

2. The driving device according to claim 1, wherein the moving member is connected to the member to be driven so that rotation of the vibrator and the friction member around the axis in the first direction is restricted.

3. The driving device according to claim 1, wherein the moving member is fixed to the friction member, and the friction member moves when the vibrator vibrates.

4. The driving device according to claim 1, further comprising urging means that urges the moving member and the member to be driven against each other in the first direction to connect the moving member and the member to be driven.

5. The driving device according to claim 1, wherein the first guide portion restricts rotations of the vibrator and the friction member around an axis in a direction orthogonal to the first direction.

6. The driving device according to claim 1, wherein the first guide portion includes a groove portion that extends in the first direction and a plurality of ball members arranged such that the ball members are in contact with an inner surface of the groove portion.

7. The driving device according to claim 6, wherein the groove portion includes a plurality of grooves that are arranged in the first direction, and
   wherein the ball members are in contact with inner surfaces of the respective grooves.

8. An optical device comprising:
   a vibrator;
   a friction member that is in frictional contact with the vibrator;
   a first guide portion that guides the vibrator or the friction member in a first direction when the vibrator vibrates so that the vibrator and the friction member move relative to each other, the first guide portion enabling rotation of either one of the vibrator or the friction member which moves around an axis in the first direction;

a moving member that moves when the vibrator and the friction member move relative to each other, the moving member being connected to a member to be driven; and a second guide portion that guides the member to be driven in a second direction when the moving member moves, wherein the moving member is connected to the member to be driven such that the moving member is rotatable and movable in a direction orthogonal to the first direction with respect to the member to be driven, and wherein the member to be driven retains an optical lens.

9. An image pickup device comprising:

a vibrator;

a friction member that is in frictional contact with the vibrator;

a first guide portion that guides the vibrator or the friction member in a first direction when the vibrator vibrates so that the vibrator and the friction member move relative to each other, the first guide portion enabling rotation of either one of the vibrator or the friction member which moves around an axis in the first direction;

a moving member that moves when the vibrator and the friction member move relative to each other, the moving member being connected to a member to be driven; and a second guide portion that guides the member to be driven in a second direction when the moving member moves, wherein the moving member is connected to the member to be driven such that the moving member is rotatable and movable in a direction orthogonal to the first direction with respect to the member to be driven, and wherein the member to be driven retains an image pickup element.

\* \* \* \* \*